Patented Nov. 12, 1946

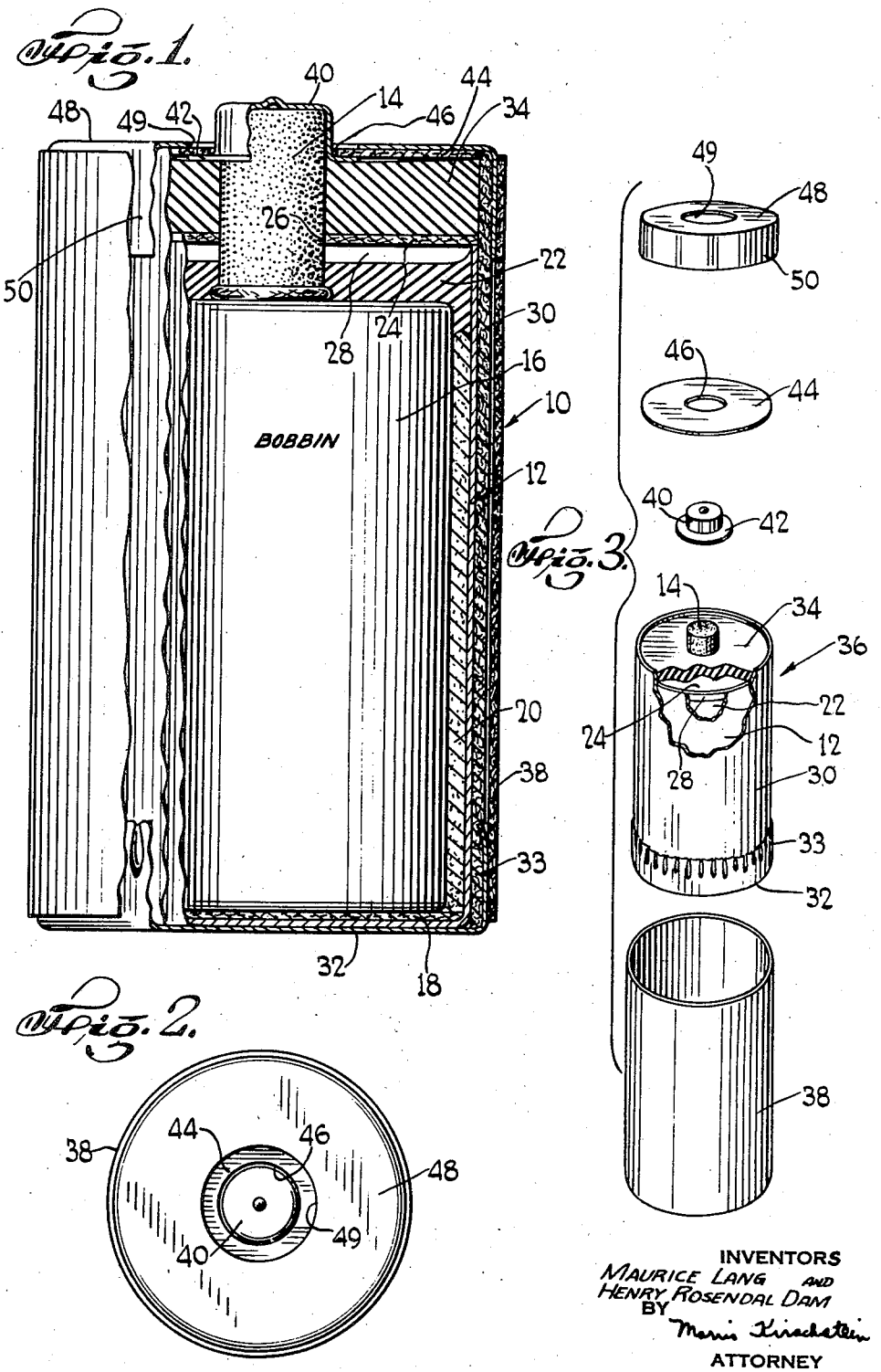

2,410,826

UNITED STATES PATENT OFFICE 2,410,826

DRY BATTERY

Maurice Lang and Henry Rosendal Dam, New York, N. Y., assignors to Henry Hyman, Brooklyn, N. Y.

Application August 16, 1941, Serial No. 407,128

6 Claims. (Cl. 136—133)

This invention relates to dry batteries, and more particularly to dry cells for use in portable, self-contained, electric lights, such as flashlights.

The term "battery" has come into common use as referring to a single unit used independently, although strictly speaking this term connotes a plurality of units. We employ the term "battery" herein as relating to the completed cell including the zinc container with the chemicals therein and the outer covering or coverings therefor. The element itself is designated in the specification as the "dry cell unit."

Primarily it is the object of our invention to provide an improved dry battery of the character described which shall be free from leakage, corrosion, seepage, creepage, swelling or like conditions, caused by internal reactions or decomposition of the dry cell elements. A cell of this nature will hereinafter be designated as "leak proof."

More specifically, it is an object of our invention to provide a leak proof dry battery of the character described having highly effective means for relieving internal gas pressure and taking up decomposition products of the dry cell unit without altering the external dimensions of the battery, and which shall comprise relatively few and simple parts, be easy to assemble and economical to manufacture, and which shall withal be sturdy in construction and highly efficient for its intended uses.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention, Fig. 1 is a vertical view in partial section of a dry battery constructed in accordance with my invention;

Fig. 2 is a top plan view thereof; and

Fig. 3 is an exploded view of said battery.

Referring now to the drawing, we have shown a dry battery 10 embodying our invention and including a dry cell unit of the well known Le Clanché type. Said unit comprises a metallic zinc cup electrode 12 containing a carbon rod electrode 14, imbedded in a depolarizing bobbin 16. To retard corrosion of the cell bottom a cardboard washer 18 is placed under the bobbin. Electrolytic paste 20 separates the bobbin from the zinc cup.

The bobbin 16 and cup electrode 12 are so proportioned that after the bobbin and carbon rod have been inserted in the cup and rest upon the washer 18, the top of the bobbin will be spaced slightly below the top edge of the cup electrode. This should be contrasted with the conventional dry cell units wherein the top surface of the bobbin is spaced a substantial distance below the top edge of the zinc cup electrode.

A soft sub-seal 22 closes off the top of the dry cell unit and prevents dehydration of the wet elements of the cell during storage. Said sub-seal may be selected from among the various sealing materials known to the art and is of such nature that it will adhere to the zinc cup and carbon post, will not crack at low temperatures or under rough handling, and will give way when pressure is created within the cell to permit extrusion of gaseous and liquid decomposition products without permitting the zinc cup electrode to be greatly distended. The sub-seal, in addition to contacting the depolarizing bobbin 16 (see Fig. 1), also enters the annular space between the bobbin and zinc cup to contact the electrolytic paste 20.

By virtue of this construction we have excluded substantially all air from the interior of the dry cell unit as compared with present day units wherein the cell seal is spaced above the depolarizing bobbin and electrolytic paste to create an air space within the unit. Due to the elimination of air spaces decomposition products, which have a deleterious corrosive effect on the zinc electrode, are more readily forced out of the cell unit and pass to the exterior thereof where, as will soon be seen, suitable provision is made to absorb the same.

The Le Clanché type of cell heretofore commonly used has had a hard top seal disposed on the exterior surface of the battery. When such a cell has been used or allowed to stand over long periods of time or subjected to a heavy short circuit drain, decomposition has occurred causing the formation of gaseous and liquified decomposition products. The gas has caused an internal pressure which forced the electrolyte paste and decomposition products out of the cell and caused the sides of the cell to distend until they came into contact with the casing of the flashlight or other appliance containing the cell. As a result the cell became frozen in the casing and the inside of the casing was often badly corroded.

To overcome these disadvantages without employing a complicated structure or requiring substantial amounts of metal, we have provided the following container for the dry cell unit whereby a practically leak proof dry battery is formed.

A cardboard washer 24, which may be fabricated from the same material as the washer 18, covers the top of the dry cell unit, the periphery thereof resting upon the top edge of the cup electrode 12. The carbon rod 14 projects through an aperture 26 in the washer 24. Said washer serves to separate the sub-seal 22 from a hard top seal hereinafter described since, in the absence of the washer, when the top seal is poured in molten condition, according to customary practice, it would liquify or plasticize the soft sub-seal, causing same to break away from the zinc cup. It will be noted that the top surface of the sub-seal is spaced a short distance below the top of the dry cell unit so that a small air space 28 is provided between the washer 24 and sub-seal 22. This air space serves to further insulate the sub-seal 22 from the heat of the top seal when the latter is being poured.

The zinc electrode 12 is telescopically received in a cup-shaped container comprising a paper tube 30. The paper from which the tube 30 is fabricated is of sufficient thickness and rigidity to impart thereto substantial mechanical strength and is porous and highly absorbent for reasons which will soon become apparent. The bottom end of the tube is closed off by a plate 32 of light gauge electrically conductive metal whose outer edges are bent up into a wall 33 which is pressed into the lower portion of the tube to form a tight joint therewith. The zinc cup rests solidly on the closure 32 making a good electric contact therewith in order that the closure which is exposed in the completed battery 10 may form one of the battery terminals. The wall 33 may be raised slightly beyond the outer surface of the tube 30.

It will be noted that the upper edge of the tube 30 extends above the washer 24 and in the space thus provided we pour plastic material which sets into a hard top seal 34, bonded with the washer 24 and the paper tube 30. Due to the high porosity and absorbtivity of the tube 30 an excellent bond is formed between it and the seal 34 which is superior to the bond between sealing material and metal or water impermeable paper, and thus minimizes the danger of leakage or creepage around the edges of the hard seal.

The sub-battery unit 36 (see Fig. 3), formed upon pouring of the seal 34, is leak proof in nature. If such a unit is subjected to short circuit conditions, or used or allowed to stand over such a long period of time that decomposition of the cell elements ensues, the liquid decomposition products which result, and which may be forced through or around the sub-seal 22 or through the walls of the zinc cup 12, in the event that the same are badly corroded or punctured, are absorbed by the paper tube 30. Moreover, the porous, highly absorbent tube acts as a gas vent allowing the gaseous decomposition products which are emitted from the cell to pass freely therethrough without causing distension. Such gaseous decomposition products leave the dry cell unit either through the soft sub-seal 22 or through the zinc electrode 12, in the event that the latter is ruptured. Gaseous decomposition products ejected through the sub-seal pass between the washer 24 and top edge of the zinc electrode 12. Thus, in either event, the gaseous decomposition products reach the inner surface of the porous tube 30. Said products then permeate through the tube into the space between said tube and an impervious sheath 38, shortly to be described in more detail. From this space the gaseous decomposition products leak out to the atmosphere in two directions, one between said sheath and the metal plate 32, and the other between said sheath and a cup 48, described hereinafter in detail. Any liquid decomposition products which may reach the metal plate 32 will be present in such small amounts (due to absorption by the paper tube 30 while the said products are traveling down the exterior surface of the zinc electrode 12) that they will not greatly affect or corrode the bottom plate.

Under extremely severe service conditions enough liquid decomposition products may be emitted from the cell to wet through the paper tube 30. In order to prevent this moisture from reaching the outer surface of the battery and coming into contact with any part of the instrument with which the battery is used, and to furnish a neat exterior, we provide a paper tubular sheath 38 over the paper tube 30. This sheath includes at least one layer of asphaltum paper or other waterproof material to render it impervious to moisture and may be suitably finished, colored and printed in any manner well known to the art.

To enhance the appearance of the battery, we place a brass cap 40, such as is commonly used in the art, on top of the carbon rod 14. The brass cap has a lower flanged portion 42 which rests on the top seal 34. Superimposed on the top seal is an insulating washer 44 whose top surface may be ornamentally finished, as with a bright red paint. Said washer is provided with a centrally located aperture 46 through which the cap 40 projects. The top end of the sub-battery unit 36 is covered by a plated metal cup 48 having an oversized aperture 49 through which the brass cap 40 extends. The cylindrical portion 50 of the cup is so dimensioned that it will embrace the top of the paper tube 30 in a force-fit, and be slightly raised beyond the surface thereof in a manner similar to the walls 33 of the bottom closure 32.

The internal diameter of the sheath 38 is made slightly smaller than the external diameter of the cylindrical portion of the cap and the wall 33 of the bottom closure so that when the unit is assembled the sheath will engage the top cap and bottom closure in a tight fit. As is obvious, this fit is not air tight so that the outside of the tube 30 is permanently at atmospheric pressure.

Due to the elevation of the above mentioned portions of the cap 48 and closure 32 over the tube 30, a small air space is created between the said tube 30 and sheath 38. This space serves to prevent transference of moisture from the tube to the sheath and allows the tube to swell up upon absorption of moisture without altering the external dimensions of the battery. Additionally, this air space permits a slight distension of the zinc cup electrode to occur prior to permitting passage of gaseous decomposition products without expanding the diameter of the sheath 38 and causing same to be bound within a flashlight casing. If desired, a similar small air space having a similar function may be provided between the cup electrode 12 and the tube 30.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. An electric dry battery comprising a metal cup electrode, a carbon rod electrode centrally disposed in said cup electrode, a depolarizing bobbin surrounding said rod, an electrolyte interposed between said bobbin and said cup electrode, the top surface of said bobbin being spaced only a short distance below the top edge of said cup electrode, a seal between said central electrode and said cup electrode, said seal contacting said bobbin and said electrolyte to prevent formation of an air space between said seal and said bobbin and electrolyte, a washer resting upon the top edge of said cup electrode, said central electrode projecting through an aperture in said washer, a closed imperforate self-form-maintaining container in which said cup electrode and said washer are snugly nested and secured, said container having tubular side walls of a porous highly absorbent electrically non-conductive material which are in contact with the entire exterior surface of the side walls of said cup electrode on their other side, said porous absorbent side walls thus serving to permit passage of the gaseous battery decomposition products and to absorb liquid battery decomposition products escaping through said seal or cup, said container having a metal bottom attached to the porous absorbent side walls thereof on which said cup electrode rests, and a top seal between said central electrode and the top of said porous absorbent side walls, the bottom surface of said seal being defined by the upper surface of said washer.

2. An electric dry battery comprising a metal cup electrode, a carbon rod electrode centrally disposed in said cup electrode, a depolarizing bobbin surrounding said rod, an electrolyte interposed between said bobbin and said cup electrode, the top surface of said bobbin being spaced only a short distance below the top edge of said cup electrode, a soft sub-seal between said central electrode and said cup electrode, the top surface of said sub-seal being spaced from the top edge of said cup electrode, said seal contacting said bobbin and said electrolyte to prevent formation of an air space between said seal and said bobbin and electrolyte, a washer resting upon the top edge of said cup electrode, said central electrode projecting through an aperture in said washer, an imperforate closed self-form-maintaining container in which said cup electrode and said washer are snugly nested and secured, said container having tubular side walls of a porous highly absorbent electrically non-conductive material which are in contact with the entire exterior surface of the side walls of said cup electrode on their other side, said porous absorbent side walls thus serving to permit passage of the gaseous battery decomposition products and to absorb liquid battery decomposition products escaping through said seal or cup, said container having a metal bottom attached to the porous absorbent side walls thereof on which said cup electrode rests and a top seal between said central electrode and the top portion of said porous absorbent side walls, the bottom surface of said seal being bonded with said washer and the side edges of said seal being bonded with said porous absorbent side walls.

3. An electric dry battery comprising a metal cup electrode, a carbon rod electrode centrally disposed in said cup electrode, a depolarizing bobbin surrounding said rod, an electrolyte interposed between said bobbin and said cup electrode, the top surface of said bobbin being spaced only a short distance below the top edge of said cup electrode, a soft sub-seal between said central electrode and said cup electrode, the top surface of said sub-seal being spaced from the top edge of said cup electrode, said seal contacting said bobbin and said electrolyte to prevent formation of an air space between said seal and said bobbin and electrolyte, a washer resting upon the top edge of said cup electrode, said central electrode projecting through an aperture in said washer, an imperforate closed self-form-maintaining container in which said cup electrode and said washer are snugly nested and secured, said container having tubular side walls of a porous highly absorbent electrically non-conductive material which are in contact with the entire exterior surface of the side walls of said cup electrode on their other side, said porous absorbent side walls thus serving to permit passage of the gaseous battery decomposition products and to absorb liquid battery decomposition products escaping through said seal or cup, said container having a metal bottom attached to the porous absorbent side walls thereof on which said cup electrode rests, a top seal between said central electrode and the top portion of said porous absorbent side walls, the bottom surface of said seal being bonded with said washer and the side edges of said seal being bonded with said porous absorbent side walls, and a sheath comprising at least one layer of a water impervious substance which is disposed around said container and is tightly fitted to the ends of said container.

4. An electric dry battery comprising a zinc cup electrode, a carbon rod electrode, a sub-seal between the top of said cup electrode and said rod electrode which permits the passage of fluid battery decomposition products under a pressure insufficient to substantially distend said cup electrode, said rod electrode projecting substantially above said sub-seal, a self-form-maintaining tube fitted around said cup electrode, a top closure between the top of said tube and said carbon electrode, said tube being imperforate and of a porous highly absorbent electrically non-conductive material, whereby said tube serves to permit passage of the gaseous battery decomposition products and to absorb the liquid battery decomposition products escaping through said sub-seal or through corrosive perforations in the cup electrode, and an open-ended tubular sheath of water-impermeable material fitted around said porous absorbent tube to prevent moisture which reaches the outer surface of said tube from coming into contact with any part of a device with which the battery is used.

5. An electric dry battery as set forth in claim 4, wherein the open bottom end of the porous absorbent tube has a metal bottom fixedly attached thereto and in contact with the cup electrode so as to serve as a battery terminal.

6. An electric dry battery as set forth in claim 4, wherein the open bottom end of the porous absorbent tube has a metal bottom fixedly attached thereto and in contact with the cup electrode so as to serve as a battery terminal, and wherein means is provided to maintain the top closure separate from the sub-seal.

MAURICE LANG.
HENRY ROSENDAL DAM.